April 11, 1950     L. M. POTTS     2,504,044
MECHANICAL CIPHERING UNIT
Filed July 5, 1946     10 Sheets-Sheet 1
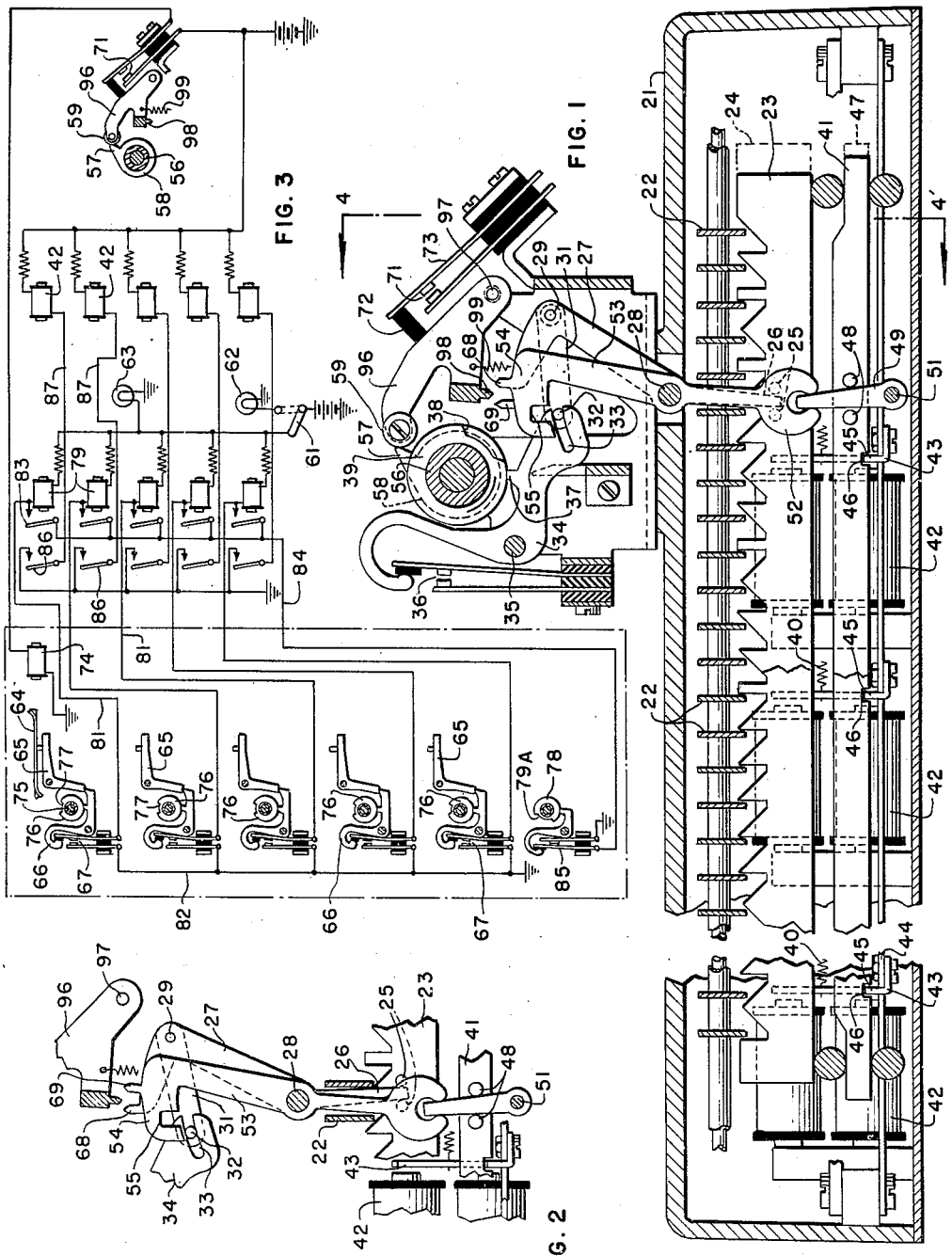
INVENTOR
LOUIS M. POTTS, DECEASED
MARTHA W. C. POTTS, EXECUTRIX
BY Emery Robinson
ATTORNEY April 11, 1950      L. M. POTTS      2,504,044
MECHANICAL CIPHERING UNIT
Filed July 5, 1946      10 Sheets-Sheet 2
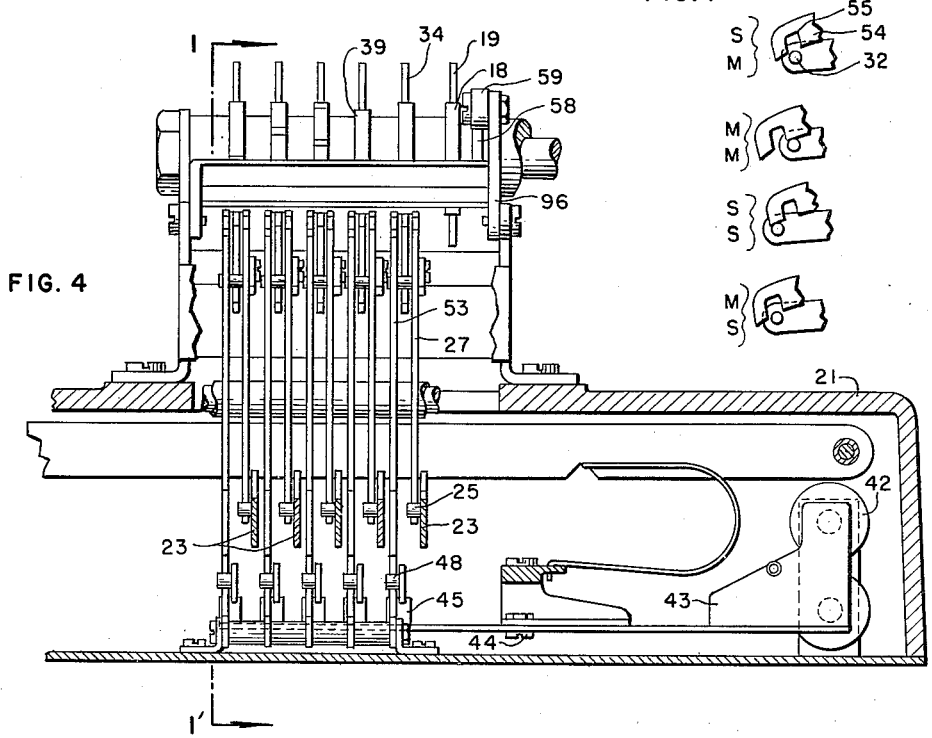
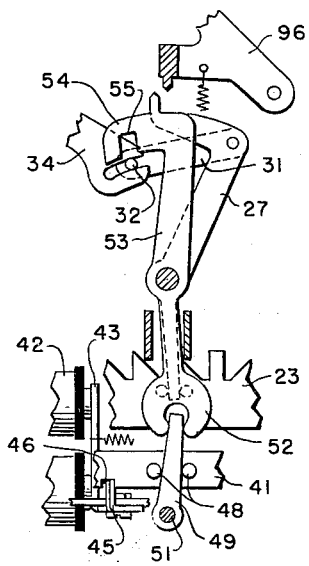
INVENTOR
LOUIS M. POTTS, DECEASED
MARTHA W. C. POTTS, EXECUTRIX
BY Emery Robinson
ATTORNEY April 11, 1950 — L. M. POTTS — 2,504,044
MECHANICAL CIPHERING UNIT
Filed July 5, 1946 — 10 Sheets-Sheet 3

INVENTOR
LOUIS M. POTTS, DECEASED
MARTHA W. C. POTTS, EXECUTRIX
BY Emery Robinson
ATTORNEY April 11, 1950 L. M. POTTS 2,504,044
MECHANICAL CIPHERING UNIT
Filed July 5, 1946 10 Sheets-Sheet 4

INVENTOR
LOUIS M. POTTS, DECEASED
MARTHA W. C. POTTS, EXECUTRIX
BY Emery Robinson
ATTORNEY April 11, 1950   L. M. POTTS   2,504,044
MECHANICAL CIPHERING UNIT Filed July 5, 1946   10 Sheets-Sheet 5

INVENTOR
LOUIS M. POTTS, DECEASED
MARTHA W. C. POTTS, EXECUTRIX
BY Emery Robinson
ATTORNEY April 11, 1950

L. M. POTTS 2,504,044

MECHANICAL CIPHERING UNIT

Filed July 5, 1946

INVENTOR
LOUIS M. POTTS, DECEASED
MARTHA W. C. POTTS, EXECUTRIX

BY Emery Robinson
ATTORNEY

April 11, 1950 L. M. POTTS 2,504,044
MECHANICAL CIPHERING UNIT
Filed July 5, 1946 10 Sheets-Sheet 7
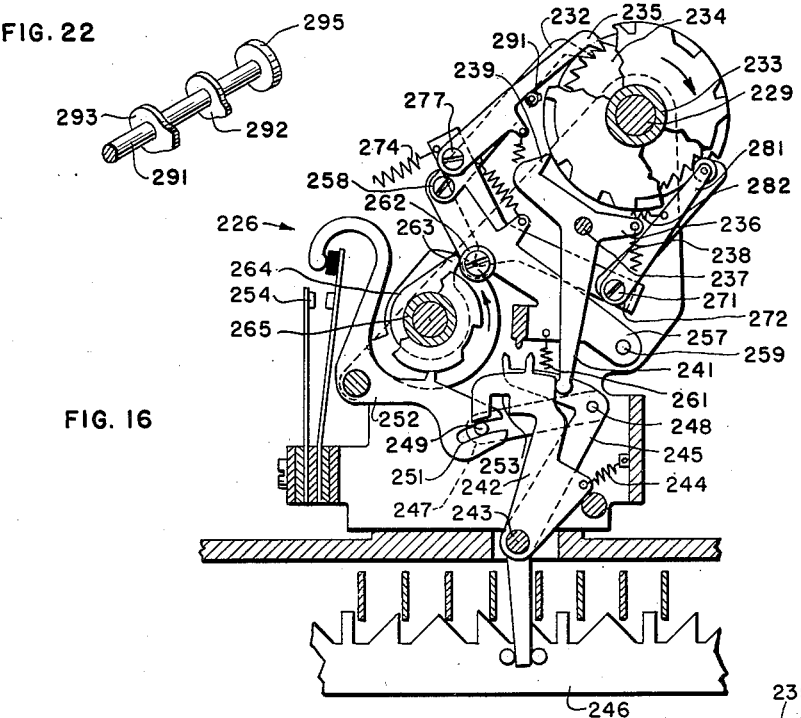
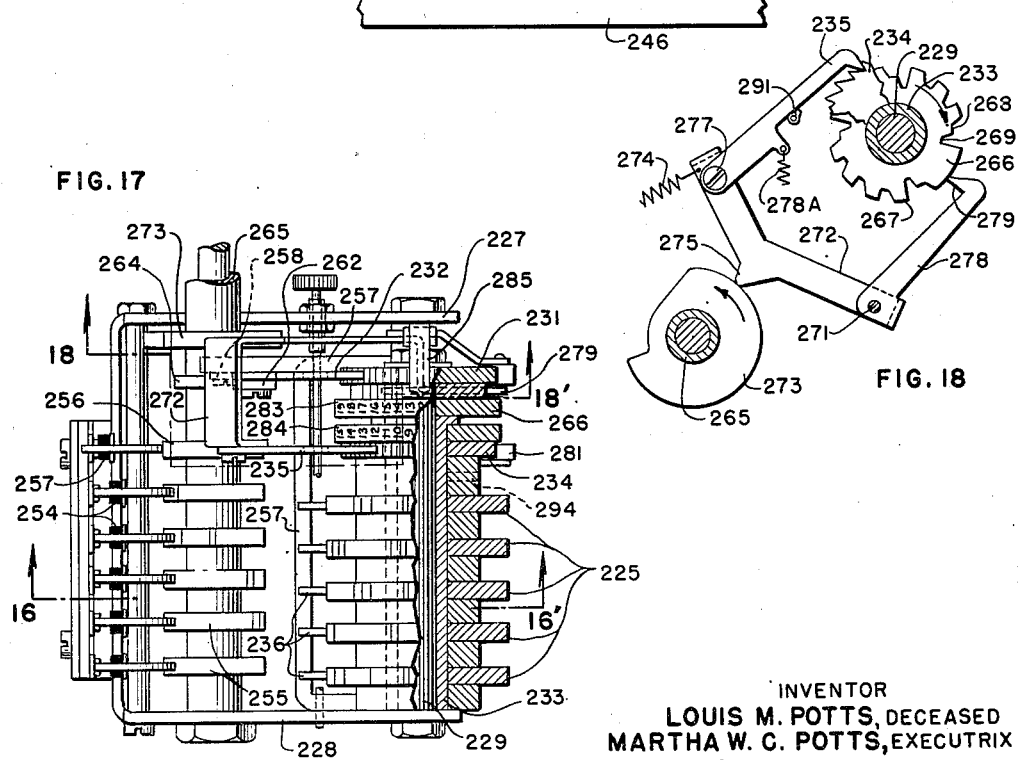
INVENTOR
LOUIS M. POTTS, DECEASED
MARTHA W. C. POTTS, EXECUTRIX
BY Emery Robinson
ATTORNEY April 11, 1950   L. M. POTTS   2,504,044
MECHANICAL CIPHERING UNIT
Filed July 5, 1946   10 Sheets-Sheet 8

INVENTOR
LOUIS M. POTTS, DECEASED
MARTHA W. C. POTTS, EXECUTRIX
BY Emery Robinson
ATTORNEY April 11, 1950     L. M. POTTS     2,504,044
MECHANICAL CIPHERING UNIT
Filed July 5, 1946     10 Sheets-Sheet 9

INVENTOR
LOUIS M. POTTS, DECEASED
MARTHA W. C. POTTS, EXECUTRIX
BY *Emery Robinson*
ATTORNEY April 11, 1950     L. M. POTTS     2,504,044
MECHANICAL CIPHERING UNIT
Filed July 5, 1946     10 Sheets-Sheet 10
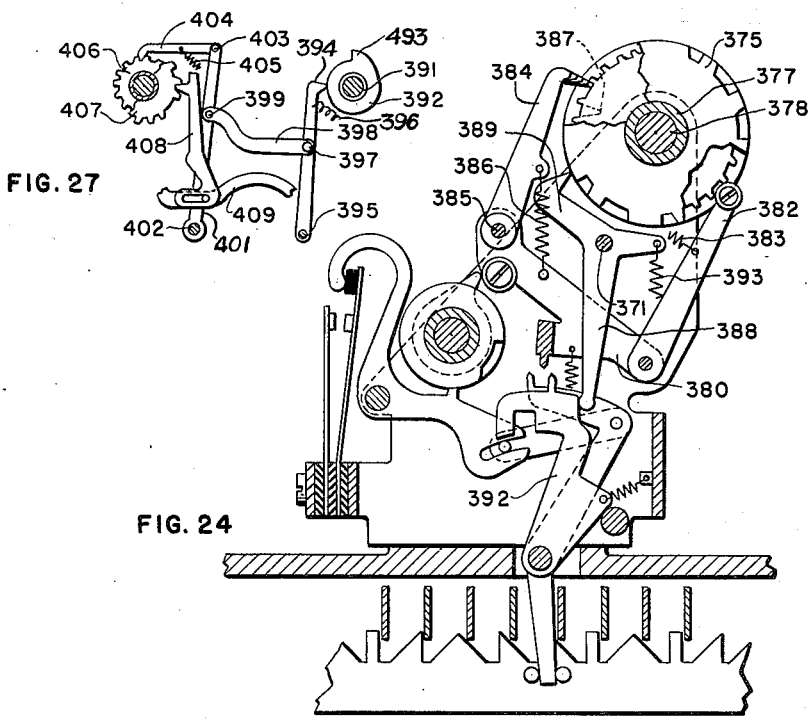
FIG. 27
FIG. 24
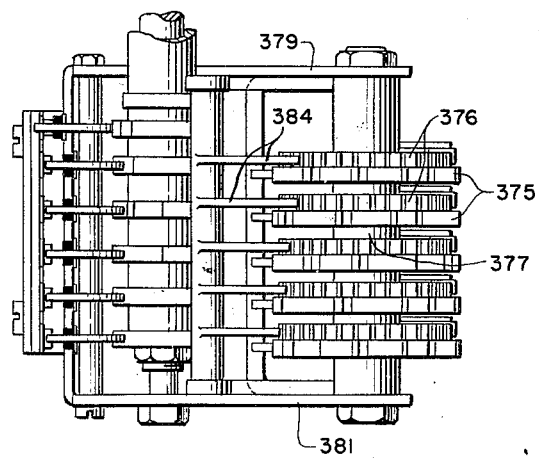
FIG. 25
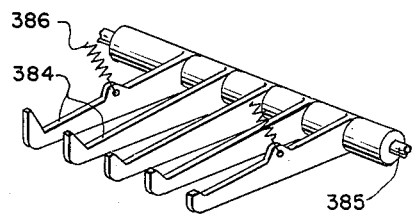
FIG. 26
INVENTOR
LOUIS M. POTTS, DECEASED
MARTHA W. C. POTTS, EXECUTRIX
BY Emery Robinson
ATTORNEY Patented Apr. 11, 1950

2,504,044

UNITED STATES PATENT OFFICE 2,504,044

MECHANICAL CIPHERING UNIT

Louis M. Potts, deceased, late of Evanston, Ill., by Martha W. C. Potts, executrix, Evanston, Ill., assignor to Teletype Corporation, Chicago, Ill., a corporation of Delaware Application July 5, 1946, Serial No. 681,444

7 Claims. (Cl. 178—22)

This invention relates to secret printing telegraph systems and particularly to mechanical ciphering units for accomplishing the enciphering and deciphering of telegraph messages.

A chief object of the invention is the provision of mechanical ciphering units for secret telegraph message communication.

Another object of the invention is the provision of mechanisms for use with standard printing telegraph apparatus for performing ciphering operations.

An additional object of the invention is the provision of key coding drums which afford a large number of key signal code permutations for ciphering operations without repetition.

A further object of the invention is the provision of circuit arrangements which can be conveniently used with the ciphering mechanisms in standard printing telegraph apparatus.

Other objects, features and advantages of the invention will appear as the description of the invention progresses.

One embodiment of the invention features the employment of key tape controlled coding magnets for use with a combined telegraph transmitting and printing apparatus of the type disclosed in the patent of S. Morton et al., 1,904,164, dated April 18, 1933. One set of magnets is used to furnish key signal code combinations which combine with original or plain English signal code combinations to encipher outgoing signals in a transmitter of the type disclosed in the Morton et al. patent, in which the well known Baudot start-stop system is utilized. In the type of ciphering employed in the instant invention a like condition of individual elements of the original signal code permutations and the individual elements of the key signal code permutations result in a spacing signal. On the other hand, unlike conditions of the elements result in a marking signal. For a more detailed description of such a system, reference should be had to the copending application Serial No. 462,522, filed October 19, 1942, in the name of Louis M. Potts and which issued as Patent No. 2,403,679 on July 9, 1946. The set of coding magnets used with the transmitter operate mechanical elements which combine with mechanical elements controlled from the printer keyboard to ultimately determine the position of the transmitting levers. For the printing operation a second set of coding magnets are provided which control mechanical elements which combine with the swords controlled from a selector magnet to ultimately determine the position of the selector vanes of the printer.

The code magnets for the transmitter and the receiver are controlled by suitable circuit arrangements. For particular use with this type of printing telegraph apparatus an additional circuit is provided whereby enciphered signals transmitted over an outgoing line are deciphered by the printer to print a plain English home record at the transmitting station and in which the same key tape is used for both enciphering and deciphering purposes.

A second form of the invention utilizes a set of key coding drums having thirty-two positions for providing a large number of key signals, in place of a key tape for transmitting purposes and a second set of identical key coding drums having a like number of positions for receiving purposes. The mechanical coding elements are under the control of feelers which sense the code drum, allowing mechanical ciphering elements to shift to a spacing or marking position determined by the particular portion of the code drum which presents itself at a particular time, the periphery of the code drum being cut in a promiscuous manner representative of marking and spacing conditions. One stepping device is provided which steps a shaft on which the drums are mounted by means of a sleeve, in each cycle of operation. The drums are not advanced by this stepping device but a second stepping device is provided for such a purpose with a variable feeding arrangement, the amount of feed being determined by the position of a disc rotatable with the first stepping device. This disc is cut to varying depths and determines whether the drums will remain in the same position or whether they will be advanced one or two steps. It is, of course, conceivable that additional depths could be provided in this disc to obtain a greater variety of feeding.

Rotatable with the shaft referred to above is an indicating dial, while a second indicating dial is provided which is rotatable with the code drum sleeve. The dials at a transmitting station could be set at identical positions with dials at a receiving station by a prearrangement before the commencement of ciphering operations. The code drum device is further provided with an adjustable cam shaft which may disable the first stepping device if less secretive or simpler ciphering is desirable, permitting the drums to be stepped a uniform number of positions each time. For even less secretive or more simple ciphering, the cam shaft may be moved to a position to disable both stepping devices allowing the code drums to remain stationary during ciphering operation. One set of code drums is employed for controlling the ultimate position of the transmitting levers for transmission while for reception a second set of code drums is provided for determining the ultimate position of the printer vanes.

The invention also provides a modified form of code drums which are individually operable to thirty-two positions to afford a greater variety of signal code permutations. Each code drum is individually associated with a ratchet with each ratchet being driven by a pawl of progressively shorter length. Each ratchet is provided with a special notch, except the one driven by the shortest pawl, the one associated with the longest pawl having the deepest notch, the other notches being progressively less deep. At other positions of the ratchet the configuration of the ratchets are identical. The ratchet driven by the shortest pawl has no special notch cut therein, its periphery being the same as the other ratchets, except at the portions where they are notched.

Assuming that the notches of the ratchets are all in alignment at the start, the first stepping operation of the pawls which are mounted on a common arm and operable in unison, will advance all the ratchets one step. On the next stepping operation, only the ratchet with the longest pawl will be advanced. This will continue until this ratchet is stepped completely around at which position the deep notch of the ratchet will present itself for the next stepping operation. On the next stepping operation both the longest pawl and the next to the longest pawl will step their respective ratchets. On the immediately following stepping operation only the longest pawl will again step its ratchet. The operation will continue until a point will be reached where all the notches are again in alignment. Since, mathematically, the code drums will not repeat themselves until they are stepped thirty-two to the fifth power times, 33,554,432 key code combinations may be provided before the device repeats itself.

The invention may be more readily comprehended by reference to the detailed description which follows when read with reference to the drawings in which:

Fig. 1 is a front sectional view, taken along line 1—1' of Fig. 4, in section, of a keyboard controlled transmitter particularly illustrating the transmitter used in the first embodiment of the invention;

Fig. 2 is a detail view of a portion of the ciphering mechanism;

Fig. 3 is a schematic circuit particularly designed for use with the ciphering mechanism illustrated in Fig. 1;

Fig. 4 is an end view of the keyboard controlled transmitter taken along the line 4—4' of Fig. 1;

Figs. 5 and 6 are detail views of the ciphering mechanism;

Fig. 7 is a chart illustrating the four possible conditions of the ciphering mechanism during an enciphering operation;

Figure 8:
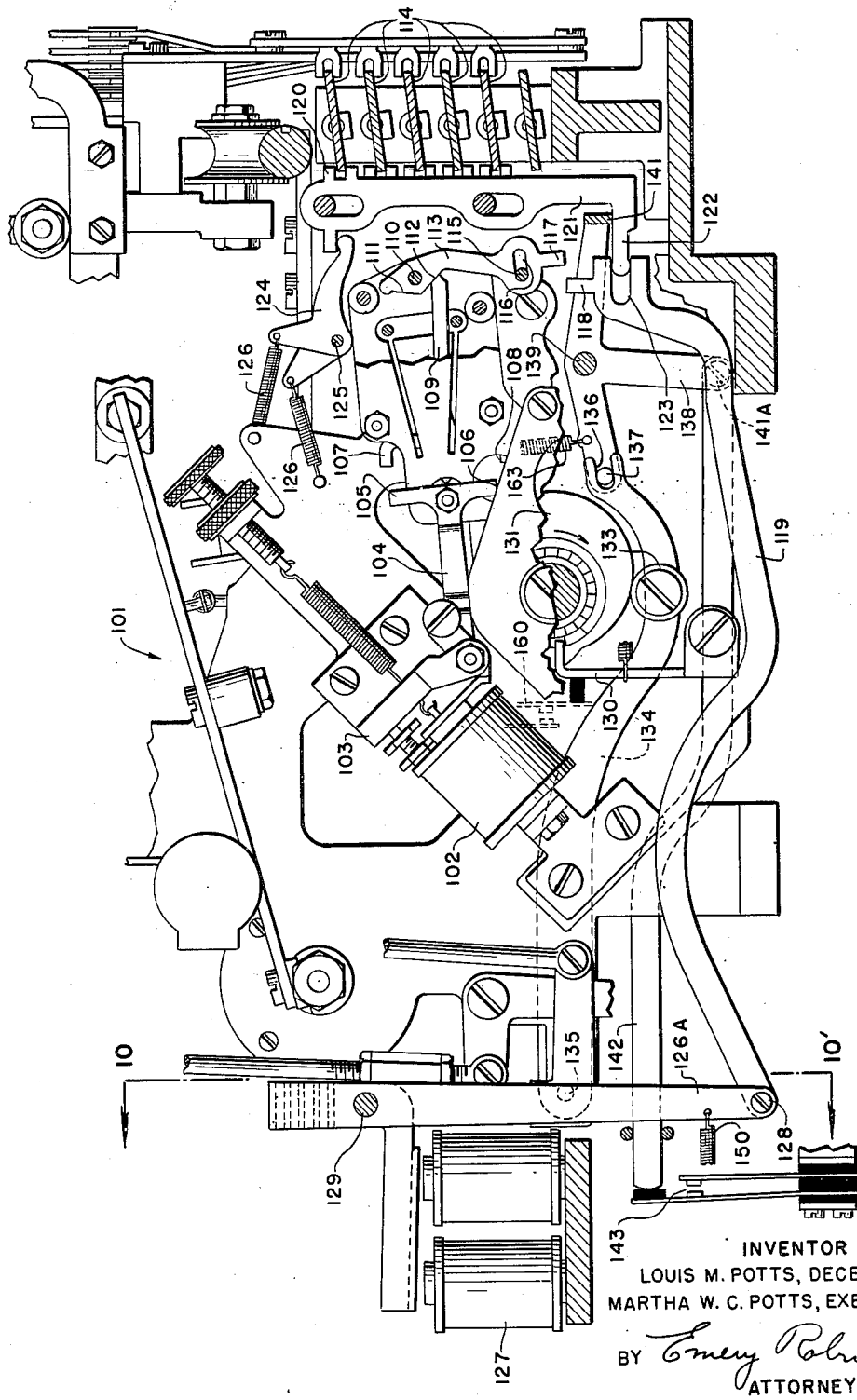
Fig. 8 is an end elevation of a telegraph printer with parts broken away and partly in section to illustrate the main features of the invention.
Figure 10:
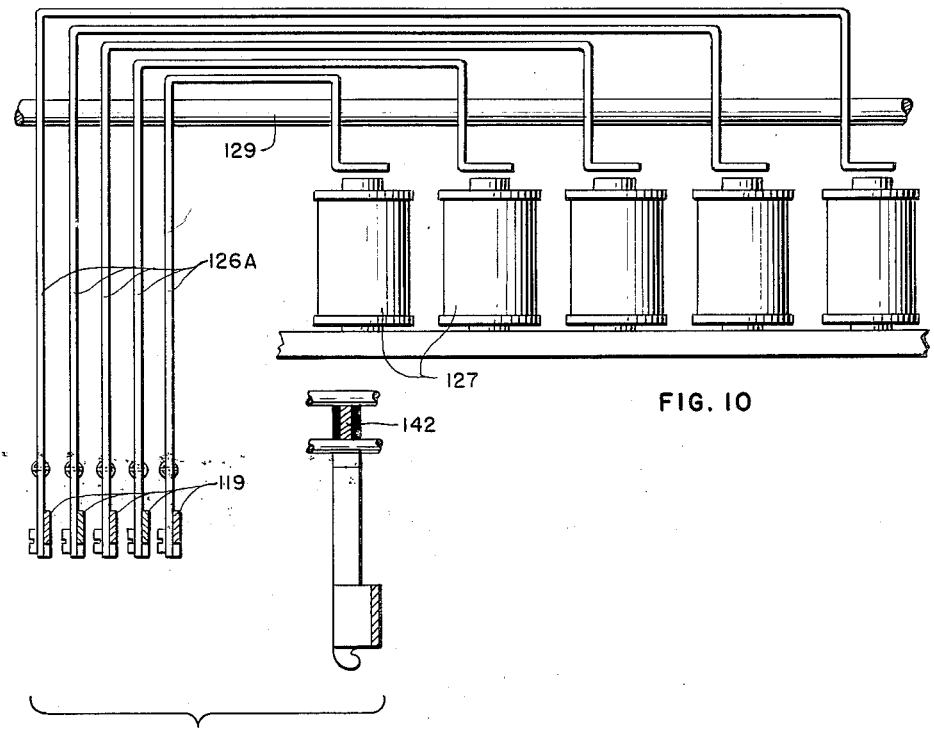
Fig. 10 is a detail view of the coding magnets and armature levers used for the printing ciphering operation taken on the line 10—10' of Fig. 8.
Figure 9:
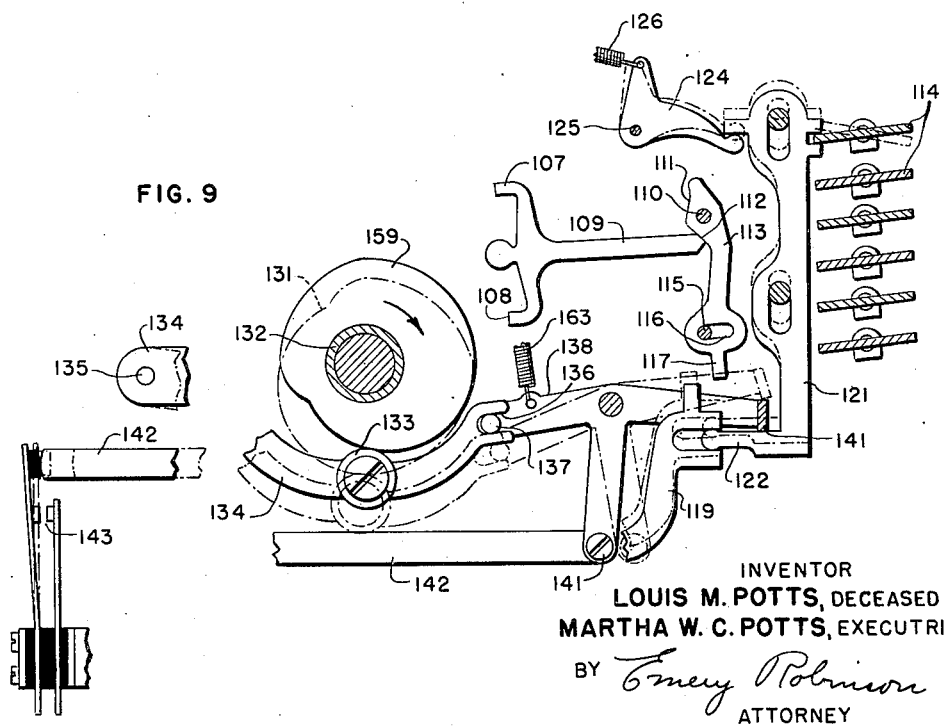
Fig. 9 is a detail view of the printer ciphering mechanisms.
Figures 11, 12, 13:
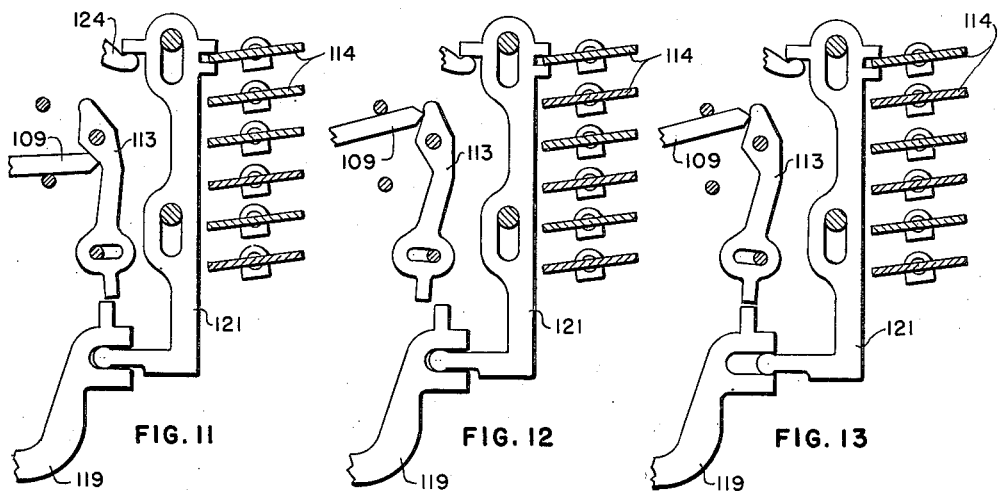
Figure 14:
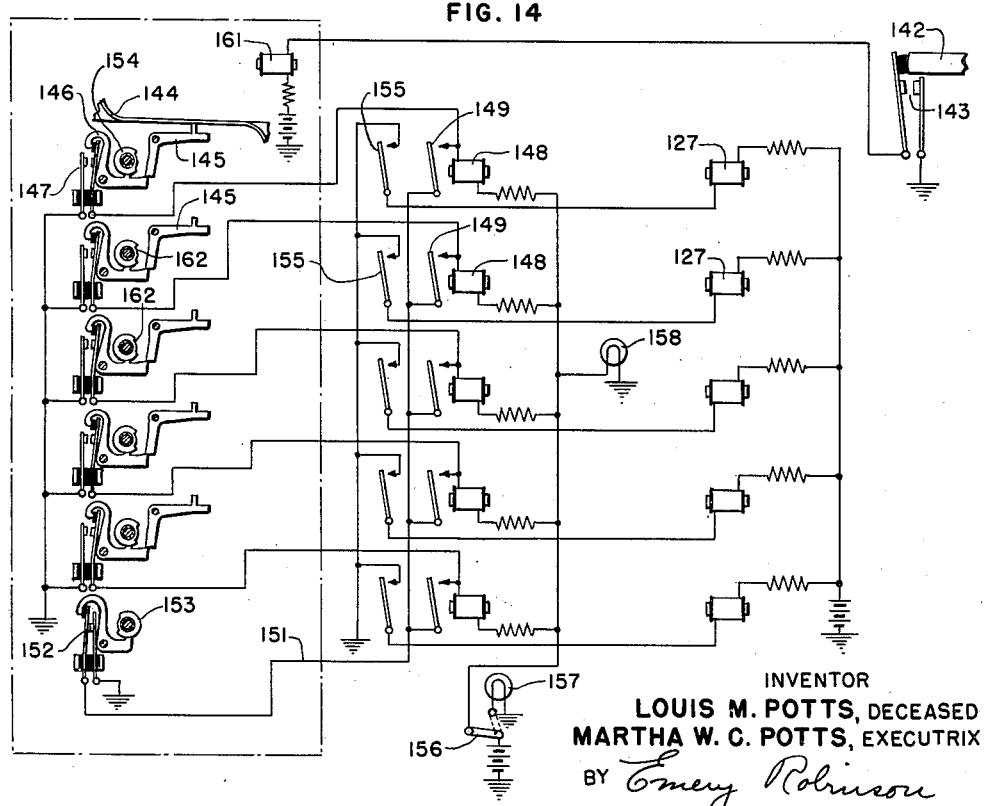
Figure 15:
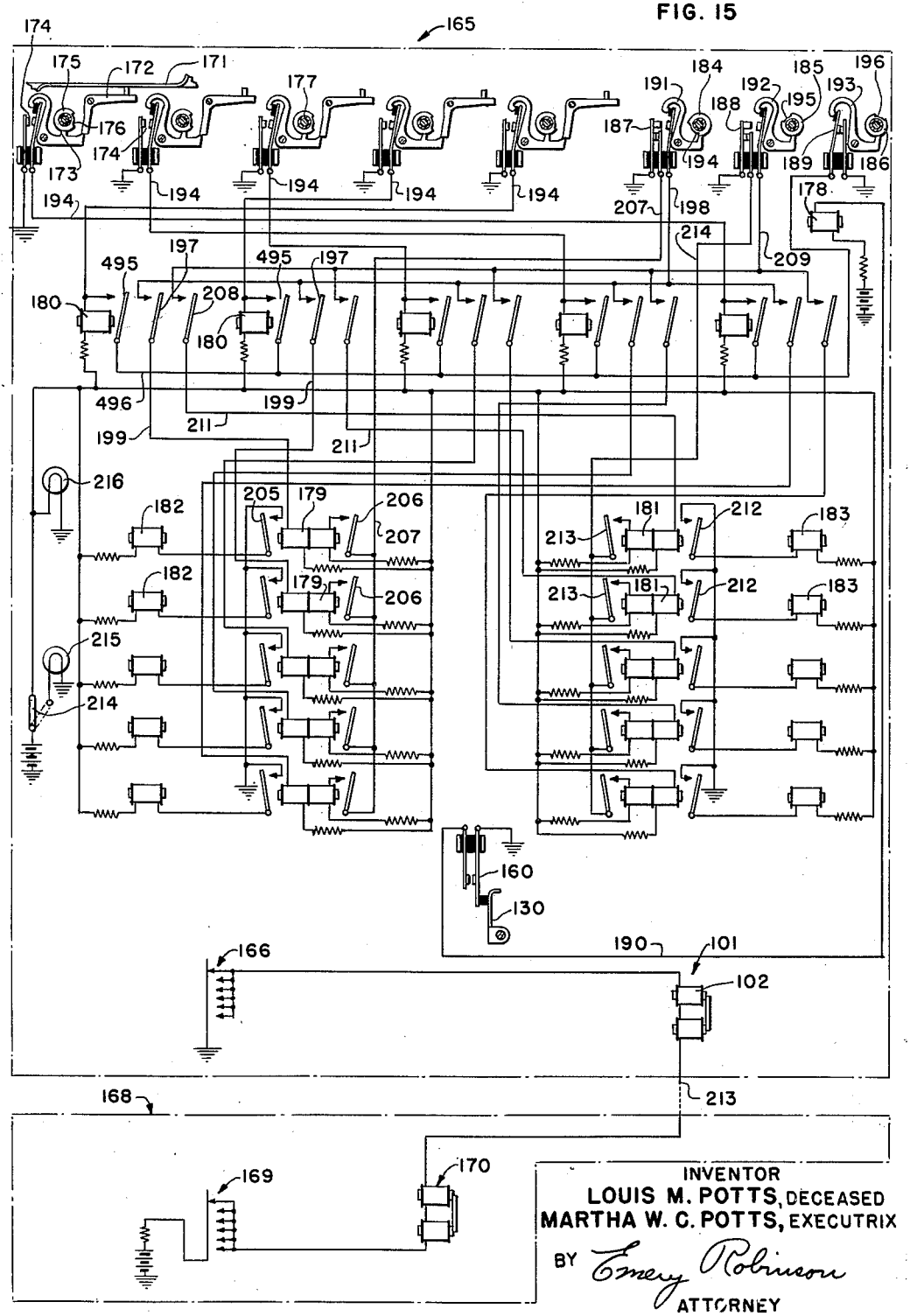
Figures 19, 23:
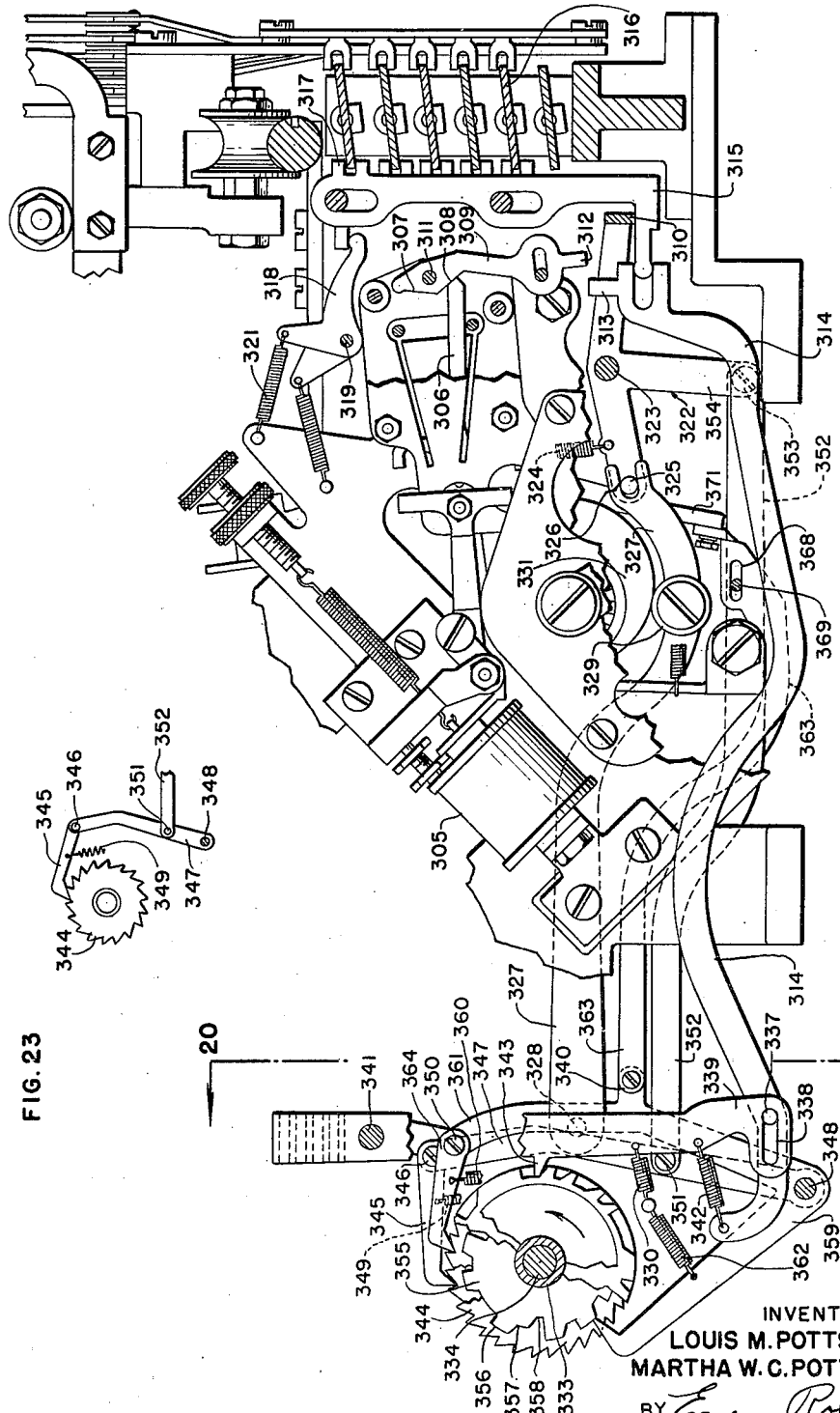
Figure 20:
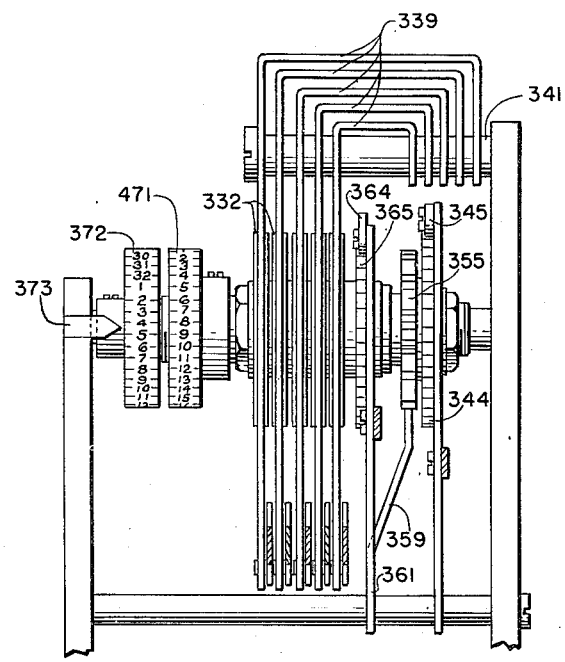
Figure 21:
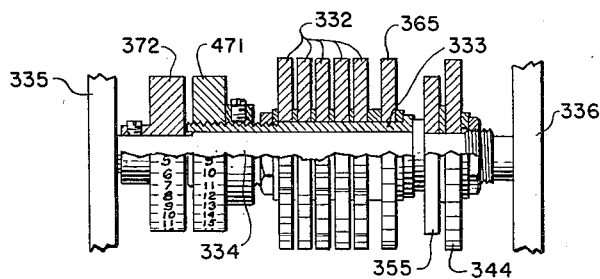

Figs. 11, 12, and 13 illustrate different positions of the selector swords and ciphering bars for the printing operation;

Fig. 14 is an illustration of the circuit used to control the coding magnets;

Fig. 15 is a modified form of the circuit designed for use with the first embodiment of the invention;

Fig. 16 is a view taken on line 16—16' of Fig. 17 of a modified form of the invention illustrating a portion of a keyboard transmitter using key coding drums for ciphering purposes;

Fig. 17 is a plan view of the apparatus shown in Fig. 16;

Fig. 18 is a detail view taken on the line 18—18' of Fig. 17 of a pawl and ratchet stepping mechanism used in the modification of the invention shown in Fig. 16;

Fig. 19 is an end view of a portion of the receiver using key coding cams for deciphering;

Fig. 20 is a front elevational detail view taken on the line 20—20' of Fig. 19 of the printer ciphering mechanism used for deciphering received signals;

Fig. 21 is a detail view, partly in section, illustrating the key code drums shown in Figs. 19 and 20.

Fig. 22 is a detail view of a cam arrangement for disengaging the stepping mechanism disclosed in Fig. 19;

Fig. 23 is a detail view of a portion of the stepping mechanism for the key code drums;

Fig. 24 is a view of a modified form of ciphering for a keyboard transmitter in which the key coding drums are stepped according to a different arrangement;

Fig. 25 is a partial plan view of Fig. 24;

Fig. 26 is a detail view of the stepping pawls used in this modification of the invention; and Fig. 27 is a detail view of the embodiment shown in Figs. 24 to 26 as applied to a printer receiver.

Referring particularly to Figs. 1 to 6, inclusive, the portion of the first embodiment of the invention dealing with the keyboard controlled transmitter will be described. At the outset it will be assumed that for complete details of operation of the type of printing telegraph apparatus about to be described, reference should be had to the patent of S. Morton et al., already referred to, and for specific details of operation of the keyboard controlled transmitter per se, reference should be had to the patent of H. L. Krum, No. 1,595,472, dated August 10, 1926.

In Fig. 1 of the drawings a cast metal base is indicated at 21 upon which is mounted both the keyboard transmitter and the printing apparatus with which the present invention is concerned. The keyboard transmitter is controlled from a keyboard, not shown, wherein depression of a key lever 22 governs the positioning of the five permutation bars 23 housed within the base casting 21, either to the right or left position. As shown in Fig. 1 the foremost permutation bar 23 is in its leftward or marking position with the dotted line or spacing position of permutation bar 23 being indicated at 24.

Each permutation bar 23 carries a pair of pins 25 between which is positioned a depending arm 26 of a selecting finger 27 which is pivoted about the rod 28. Pivotally mounted to each finger 27 at 29, is a link 31 which carries a pin 32 designed to ride in an arcuate slot 33 formed on a transmitting lever 34. Each transmitting lever 34 is pivoted on a rod 35 and is of the conventional type wherein it closes an associated contact pair 36 when its lug 37 is permitted to enter a notch 38 of an associated transmitting cam 39. In addition to the five transmitting cams 39 the usual sixth start stop cam 18 (Fig. 4) and contact operating lever 19 are provided. It may now be seen that when a key lever 22 moves a permutation bar 23 to the right or spacing position selecting finger 27 will pivot at 28 in a counter-clockwise direction and when a permutation bar 23 is moved to the left an opposite effect will be produced.

Also mounted within the base casting 21 below permutation bars 23 are five ciphering bars 41 which are under the control of five coding magnets 42, as will now be described. The coding magnets 42 control the position of associated armatures 43 which are pivoted at 44. Upper extensions 45 of armatures 43 engage notches 46 of ciphering bars 41. Springs 40 attached to armatures 43 are normally effective to retain cipher bars 41 in their leftward or spacing position. When a particular coding magnet 42 is energized it will attract its armature 43 about its pivot 44 to force its associated ciphering bar 41 to the right, as shown in Fig. 1, to the dotted line marking position indicated at 47.

Mounted on each ciphering bar 41 are a pair of pins 48 which engage a lever 49 pivoted at 51 the free end of which is nested in the bifurcated end 52 of a ciphering lever 53. Each ciphering lever 53 is provided at its upper end with a laterally extending arm 54 having a notch 55 designed to cooperate with the pin 32 carried by arm 31 of selecting finger 27. It is now seen, Figs. 5 and 6, that if ciphering bar 41 is moved to its right, in response to a marking impulse received by its associated code magnet 42, lever 49 will pivot in a clockwise direction thereby pivoting ciphering lever 53 in a counterclockwise position. If, however, its associated code magnet 42 receives a spacing or non-energizing impulse, ciphering lever 53 will be retained in a clockwise position, Fig. 2.

From the foregoing description it is evident by an inspection of Fig. 7 that unlike conditions of pins 32 carried by selecting fingers 27 with respect to the notches 55 of arms 54 of ciphering levers 53 will permit associated transmitting levers 34 to pivot at 35 when its lug 37 is allowed to enter notch 38 of an associated cam 39 as cam sleeve 56 is released for rotation, as will be explained. This results in a transmission of a marking or current impulse. On the other hand, it is evident that like conditions of selecting fingers 27 and ciphering levers 53 enable arm 54 to block upward movement of pin 32, thereby resulting in transmission of a spacing or no current impulse.

With particular reference to Fig. 3, the circuit for operation of coding magnets 42 will now be described. When it is desired to perform a ciphering operation manual switch 61 is moved to the left in its ciphering position as illustrated in Fig. 3. This operation causes extinguishment of green signal lamp 62 and illumination of red red signal lamp 63 over obvious circuits to indicate that a ciphering operation is taking place. The code magnets 42 are controlled by means of a key tape 64, which is sensed by sensing levers 65 which control transmitting levers 66 to thereby operate associated contact pairs 67 in the usual manner.

Since there is no coding permutation set up by the magnets 42 at the commencement of a ciphering operation, the first signal transmitted will be a plain English signal which forms no part of the message and is transmitted solely to condition the ciphering mechanisms for subsequent operations. When this signal is sent, reference to Fig. 7 will show that selecting finger 27 and pin 32 thereon will perform its normal function since as shown at A and B in Fig. 7, all ciphering levers will be in their spacing positions as no code magnets are energized. In other words, a plain English signal will be transmitted.

When the first signal is sent by operation of the keyboard, sleeve 56 is released by a single revolution clutch in the conventional manner. When this occurs, locking lever 96 will pivot at 97 under influence of spring 99 in a counterclockwise direction and by means of its blade 98 block movement of selecting fingers 27 and ciphering levers 53 through cooperation with lugs 68 carried by selecting fingers 27 and with lugs 69 carried by arms 54 of ciphering levers 53. At this time apex 57 of cam 58 moves in a counterclockwise direction, as viewed in Fig. 1, and follower 59 carried by locking lever 96 drops to the low part of the cam. Thus, during transmission of the signal by the sequential operation of contact pairs 36, selecting fingers 27 and ciphering levers 53 are held stationary. It should be remembered that in a keyboard transmitter of the type disclosed in the present invention the permutation bars 23 are set immediately upon depression of a key prior to the operation of locking lever 96 and a single revolution clutch not shown is operated which releases cam sleeve 56 for a single revolution.

Simultaneously with the operation of locking lever 96, contact pair 71 mounted with an insulating portion 72 of blade 73 thereof resting on locking lever 96, are closed and in so closing assist locking lever 96 in its counterclockwise pivotal movement, since normally in the rest position of cam 58 the longer blade 73 of the contact pair 71 is under tension.

Closure of contact pair 71 provides an obvious circuit for clutch magnet 74 which becomes energized and which controls a conventional single revolution clutch, not shown, and thereby releases cam sleeve 75 for a single rotation. Five cams 76 fixed to cam sleeve 75 are each cut with a notch 77 at a position timed approximately with the No. 3 impulse of the keyboard transmitter. A sixth cam 78 is also provided which is cut with a notch 79a corresponding approximately to the No. 2 impulse of the keyboard transmitter. The function of the sixth cam 78 is to control the locking circuit for the transfer relays 79 which initially become energized by closure of selected contact pairs 67 depending on the key signals afforded by key tape 64. This initial circuit extends from battery, through switch 61, through the winding of relay 79, over conductor 81, through closed contact pair 67 and over conductor 82 to ground. When front armature 83 is pulled up by relay 79 an obvious locking circuit is provided extending over conductor 84 and through closed contact pair 85. Operation of back armature 86 of a particular relay 79 is effective to provide an obvious circuit over conductor 87 for energizing coding magnets 42.

When cam sleeve 75 is released for rotation upon energization of clutch magnet 74, cam 78 will function approximately during the No. 2 impulse of the keyboard transmitter to open contact pair 85, de-energizing transfer relays 79 by breaking the above described locking circuits and causing therewith de-energization of coding magnets 42 and erasure of key signals stored therein. However, as already pointed out, no coding magnets 42 are energized during the transmission of the first signal but for subsequent signals opening of contact pair 85 will produce the desired results. Immediately following the opening and closing of contact pair 85, selected sensing levers 65 which are sensing perforations in tape 64 allow their associated transmitting levers 66 to close contact pairs 67. This enables the energization of coding magnets 42 according to the first key signal. Ciphering bars 41 may move to their selected positions as locking lever 96 is raised by the follower 59 when the rest position of sleeve 56 is approached.

When the operator depresses a key to send the first enciphered signal, a key signal will have been stored in coding magnets 42 and ciphering bars 41 will have been set accordingly. The depression of the key will immediately shift permutation bars 23 in accordance with the original signal. The locking lever 96 will now lock the selecting fingers 27 and the ciphering levers 53 during transmission of an enciphered signal to an outgoing line. The operation of transmitting levers 34 will of course be determined by the joint control exercised by selecting fingers 27 and ciphering levers 53, as graphically represented in Fig. 7, thus ensuring the transmission of an enciphered code signal.

With particular reference to Figs. 8 to 14, inclusive, the printer ciphering mechanism used for deciphering incoming signals transmitted by a keyboard transmitter, such as disclosed in Fig. 1, will now be described. Numeral 101 indicates generally the printing portion of a combined printing telegraph apparatus similar to the apparatus disclosed in the patent of S. Morton et al. referred to above. In this type of printing apparatus, incoming signals are received by a selector magnet 102 which operates an armature 103 in accordance with received signals which in the instant case are enciphered signals being received from a distant station. Connected with armature 103 is an armature extension 104 whose arms 105 and 106 are designed to cooperate respectively with arms 107 and 108 of five swords 109. In each operation of the swords they are moved back and arms 107 or 108 respectively engage either arm 105 or 106 of armature extension 104 according to incoming signals, resulting in the shifting of the swords to either their marking or spacing position so that on the forward movement thereof the pointed end of the sword will engage either surface 111 or 112 of levers 113. The reciprocation of the swords 109 is accomplished by means of a cam sleeve, not shown, which is controlled by a conventional single revolution clutch. This type of selector is well known in the art and its operation is completely disclosed in the Morton et al. patent.

Ordinarily swords 109 control the operation of the printer selector vanes 114 by means of a series of T-levers not shown in the present invention since the type of printing telegraph apparatus herein disclosed is designed for performing deciphering operations in addition to operating to receive plain English signals. Levers 113 which are pivoted at 110 and have a limited movement afforded by the pin 115 and slots 116, have a projecting end 117 designed to cooperate with a projecting end 118 of ciphering slides 119. The relative positions of the projecting ends 117 and 118 will determine whether a vertical slide 121 which has a rounded arm 122 in engagement with slot 123 of ciphering slides 119 will be permitted to move up, when the vanes 114 are not locked, by bell cranks 124 pivoted at 125 and normally urged in a counterclockwise direction by springs 126. The positions of slides 119 are governed by operation of armatures 126a of key coding magnets 127 to which they are pivotally attached at 128. Armatures 126a are normally urged in a clockwise direction as viewed in Fig. 8 about shaft 129 by springs 150. Articulated to each vertical slide 121 by bifurcation 120 are the vanes 114 which are normally in their spacing position but pivot to a clockwise or marking position when an associated slide 121 is permitted to move upward. It should be mentioned at this time for the sake of clarity that the normal position of the slides 119 to the left is the spacing position while the position to the right is the marking condition. Likewise, the position of levers 113 to the right is the marking position while the position to the left is the spacing position. When a nonblocking or marking condition exists with respect to projections 117 and 118, slides 121 will be enabled to move up, thereby actuating associated vanes 114 to their marking positions. If like or blocking conditions exist between projections 117 and 118 it is apparent that slides 121 will not be able to move up and the associated vanes 114 will remain in their spacing position. These blocking and nonblocking conditions are illustrated in Figs. 8 and 11 to 13.

For controlling the ciphering operation the printing cam 131 mounted on sleeve 132 (Fig. 9) is utilized. Printing cam 131 is a standard part of printing telegraph apparatus of this type and controls the operation of the printing bail, not shown, which operates a selected pull bar also not shown, the selection of which is controlled by the printing vanes 114. In the path of the high part of printing cam 131 is normally positioned a follower 133 carried by lever 134 which is pivoted near its rear extremity at 135. The front end of lever 134 is slotted at 136 whereat it is engaged by a pin 137 supported on a T-shaped lever 138 which includes a bail 141 which overlies arms 122 of the vertical slides 121. T-shaped lever 138 is normally urged in a clockwise direction as viewed in Fig. 8 by means of spring 163. The T-shaped lever 138 is pivotally connected at 141a to a rearwardly extending lever 142, the rearward extremity of which normally holds a contact pair 143 in its open position.

The circuit shown in Fig. 14 for controlling the operation of coding magnets 127 will now be described. For deciphering incoming signals, a key tape 144 is provided which is identical with the key tape at the transmitting station and occupies the same relative position. To sense perforations in tape 144 a series of tape sensing levers 145 are provided which control the operation of transmitting levers 146 in the usual manner to permit contact pairs 147 to close or remain open depending upon the permutation afforded in key tape 144.

When a particular sensing lever 145 moves into a perforation allowing closure of a contact pair 147 a circuit is made for an associated transfer relay 148. Attraction of front armature 149 provides an obvious locking circuit for transfer magnet 148 extending over common conductor 151 and through contact pair 152 which is under the control of a sixth cam 153 notched approximately for operation during receipt of the No. 2 element or impulse by the receiving selector magnet 102. The five transmitting cams 154 which control contact pairs 147 are notched approximately for operation during receipt of the No. 4 element or impulse by selector magnet 127. When armature 155 of transfer relay 148 is attracted an obvious circuit is provided for its associated coding magnet 127.

In order that the invention may be properly understood a typical deciphering operation will now be described. At the commencement of the deciphering operation by prearrangement with the transmitting station, manual switch 156 will be moved to the left which extinguishes the green signal lamp 157 and illuminates the red signal lamp 158 indicating a deciphering operation is taking place.

It will be recalled that to start the keyboard transmitter disclosed in Fig. 1 into operation a plain English signal forming no part of the message is transmitted over the line. This plain English signal has the additional function of conditioning the printer for subsequent deciphering operations. When this first signal is received by selector magnet 102, swords 109 will be positioned according to the signal code combination received. Towards the end of the revolution of the cam sleeve, not shown, controlling the swords 109, cam sleeve 132 will be released by operation of its clutch throwout lever 130 which is under the control of the sword cam sleeve. Upon the first release of cam sleeve 132, printing bail cam 131 rotates and its high part engages follower 133 of lever 134 which now pivots about its pivot 135 in a clockwise direction, and through the engagement of its slot 136 with pin 137 carried by T-lever 138, pivots T-lever 138 in a counterclockwise direction, lifting the bail 141 from holding engagement with arms 133 of vertical slides 121. Selected vertical slides 121 will now move up through operation of bell cranks 124 by their springs 126 and operate vanes 114 accordingly. In this connection it should be remembered that at the commencement of a ciphering operation all ciphering slides 119 are in their leftward or spacing position, in which position levers 113 will be set to permit plain English signal code combinations to be transferred to the vanes 114.

Shortly after the vanes 114 are set for the signal code combination, the function bail, not shown, locks the vanes during the printing operation. The function bail is controlled by a function bail cam 159 (Fig. 9) which is mounted upon the cam sleeve 132. In the latter part of the revolution of cam sleeve 132, after the printing operation is performed, vanes 114 are again unlocked, but at this time bail 141 of T-lever 138 is prepared to assume a position resting on arms 122 of vertical slides 121 holding the vertical slides 121 in their downward position. This is due to the fact that in the latter part of the revolution of printing bail cam 131, a low part thereof is presented to the follower 133 of arm 134 and spring 163 therefore functions to pivot T-lever 138 in a clockwise direction.

It should be remembered that while cam sleeve 132 is rotating, a new signal or the first enciphered signal is being received by selector magnet 102 and the swords 109 are being set to a new position. At this time levers 113 may not be able to move to their new position due to the fact that the vanes may be locked and bail 141 of T-lever 138 is in its upward position, permitting some projections 117 and 118 to block each other. However, since swords 109 reciprocate and pivot in each cycle of the operation, in their backward stroke they will acquire their new setting and in their forward movement rest against either surface 111 or surface 112 of levers 113. When vanes 114 are unlocked and bail 141 moves to its downward position upon the second release of cam sleeve 132 the swords 109 may now position levers 113 in accordance with the first enciphered signal. Therefore, by reason of the locking of the vanes 114 and operation of bail 141 a new character may be selected while the previous character is being printed, thus providing a signal overlap arrangement as is usual in this type of printing telegraph apparatus.

As cam sleeve 132 started to rotate, towards the end of the reception of the first or plain English signal by selector magnet 102, T-lever 138 was pivoted in a counterclockwise direction thereby moving the rearwardly extending lever 142 to the right permitting closure of contact pair 143. This provides an obvious circuit for a clutch magnet 161 (Fig. 14) which causes operation of a single revolution clutch, not shown, releasing cam sleeve 162 for operation. It should be borne in mind that at this time the second signal or first enciphered signal code is being set up by swords 109 as explained. Approximately during reception of the No. 2 impulse by selector magnet 102 cam 153 will open contact pair 152 breaking the locking circuit extending over conductor 151 for transfer relays 148. However, since none of the relays 148 are energized during reception of the first or plain English signal no circuit is actually broken but on subsequent operations previous signal code combinations stored in transfer relays 148 will be erased and cause a corresponding erasure of the signals stored in coding magnets 127. Approximately during reception of the No. 4 impulse by selector magnet 102 sensing levers 145 will feel for perforations in the key tape 144 set to the same position on the identical key tape at the transmitting station and accordingly contact pairs 147 will be permitted by cams 154 to close in the permutation afforded by the key tape 144 at this time. Selected transfer relays 148 will thus be energized and immediately lock up since contact pair 152 is again closed at this time. As selected code magnets 127 are energized at this time they attract armature levers 126a in a counterclockwise direction about the rod 129, thereby tending to move associated ciphering slides 119 to the right or marking position. Since the vanes 114 are unlocked approximately during the receipt of the No. 4 impulse by selector magnet 102 while the tape sensing operation is being performed, selected slides 119 may be temporarily restrained from operation depending on the exact timing if their projections 118 interfere with the projections 117 of levers 113. However, as soon as the vanes 114 are unlocked slides 119 may move to the right since coding magnet 127 at this time remains energized.

Towards the end of the second revolution of the cam sleeve which controls swords 109, cam sleeve 132 is released for operation, cam 131 operates against follower 133 of lever 134 to thereby pivot T-lever 138 in a counterclockwise direction removing bail 141 from the path of arms 122 of selected vertical slides 121 permitting them to assume their upward position. Shortly thereafter, the vanes 114 are locked and retained in their locking position during the printing operation in which a deciphered plain English signal will be printed. The deciphering operations will continue in the same manner for the remaining portion of the message.

In the just described embodiment of the invention for accomplishing key coding operation two key coding devices are employed in the form of key tapes, one being used for enciphering or transmitting purposes and the other being employed for deciphering or receiving purposes. In a modification of this embodiment of the invention there is provided a control circuit whereby a single key ciphering device in the form of a key tape sensing mechanism may be used for both enciphering and deciphering operations. With reference particularly to Fig. 15 of the drawings this modification will now be described.

Numeral 165 represents a local station which includes a combined keyboard transmitter 166 and printing receiver 101 while a distant station is represented as numeral 168 and includes a combined keyboard transmitter 169 and printing receiver 170. This type of printing telegraph apparatus is disclosed in the S. Morton et al. patent previously referred to above. It is understood that in addition to the standard printing telegraph equipment each station will be equipped with identical key coding devices. By this modification of the invention a transmitting station will send enciphered signals to an outgoing line which will be repeated in the receiving circuit of the transmitting station and deciphered to thereby print a plain English home record.

A key ciphering tape is represented by numeral 171 and controls the selective operation of sensing levers 172 which govern the operation of transmitting levers 173 and is thereby effective to permutatively regulate the closure of associated contact pairs 174 in accordance with key code signals. For enabling the permissive operation of transmitting levers 173, there are provided the usual transmitting cams 175 which in this instance are all notched at 176 for approximately the No. 5 impulse position and are mounted upon the cam sleeve 177. Cam sleeve 177 is under the control of clutch magnet 178 which releases a conventional single revolution clutch, not shown, upon closure of contact pair 160 when clutch throwout lever 130 which releases cam sleeve 132 (Figs. 8 and 9) is operated. The closure of selected contact pairs 174 enables the selective operation of primary storage relays 180 according to key signals under certain circuit conditions to be later described. The primary storage relays 180 selectively govern the operation of double wound relays 179 and 181, which respectively control the energization of selected transmitter coding magnets 182 and selected receiver coding magnets 183.

In addition to the five transmitting cams 175 there are provided on cam sleeve 177, cams 184, 185, and 186 which respectively control make before break contacts 187, 188, and contact pair 189 by means of levers 191, 192, and 193, respectively. Cam 184 is notched at 194 to correspond approximately with the start impulse position of the cam sleeve 177; cam 185 is similarly notched at 195 for the No. 2 impulse position, and cam 186 is similarly notched at 196 for the No. 3 impulse position. These so called impulse positions represent positions in the rotation of the cam sleeve 177 which correspond to the usual five positions and start-stop positions of the Baudot code.

When sensing levers 172 sense perforations in the key tape 171, selected contact pairs 174 will be closed energizing selected primary relays 180 over conductors 194 under certain operating conditions which will later appear. When a primary relay 180 is energized a locking circuit therefor is provided through attracted armature 495, over conductor 496 and through contact pair 189 controlled by cam 186. Attraction of armature 197 by a primary relay 180 prepares a circuit for transferring a selection from a primary relay 180 to double wound relay 179, when the normally open pair of the make before break contacts 187 are closed, over conductors 198, through armature 197, over conductor 199 and through the left winding of double wound relay 179.

Energization of a double wound relay 179 causes the transfer of the selection to an associated transmitter coding magnet 182 by attraction of armature 205 while attraction of its armature 206 provides a locking circuit for double wound relay 179 extending through its right winding, through armature 206, over conductor 207 and through the normally closed contact pair of the make before break contacts 187.

Attraction of armature 208 by a primary relay 180 prepares a circuit for transferring a selection from a primary relay 180 to a double wound relay 181, when the normally open pair of the make before break contacts 188 are closed, over a conductor 209, through armature 208, over a conductor 211 and through the right winding of double wound relay 181. Attraction of armature 212 by a double wound relay 181 transfers a selection to associated printer receiving coding magnets 183 while attraction of its armature 213 provides a locking circuit for double wound relay 181 extending through its left winding, through armature 213, over conductor 214 and through the normally closed contact pair of the make before break contacts 188.

To facilitate a ready understanding of this modification of the main embodiment of the invention, a description of a typical ciphering operation will now be undertaken. At the commencement of ciphering operations manual switch 214 is moved to the left extinguishing green signal lamp 215 and illuminating red signal lamp 216, over obvious circuits and indicating that a ciphering operation is taking place. In order to condition both the local station 165 and distant station 168 for ciphering operations two plain English signals chosen at random are first transmitted which form no part of the message proper. It is necessary that these two plain English signals be transmitted in order that the control circuit be conditioned to afford key ciphering signal code combinations for both the transmitter and receiver at a given station. All signals sent over the line 213 to distant station 168 will be repeated by the selector magnet 102 at the local station and printed after being deciphered by the receiver 101.

Upon the transmission of the first plain English signal, cam sleeve 132 (Fig. 9) is released as explained by operation of clutch throwout lever 130 which immediately results in the closure of contact pair 160, providing an energizing circuit for clutch magnet 178 extending over conductor 190, thereby releasing cam sleeve 177. When cam sleeve 177 is released, make before break contact 187 operates to erase the previous selection existing in code magnets 182 during the start interval of cam sleeve 177 by opening the locking circuit for double wound relays 179, thereby causing deenergization of the associated code magnets 182. However, during the first revolution of cam sleeve 177 no coding magnets 182 are yet energized. When make before break contact 187 operates to erase the selection previously existing in code magnets 182, it also functions to acquire a new selection for the code magnets 182 from primary storage relays 180 but again it must be remembered that at this time no primary relays 180 are yet energized. Make before break contacts 188 function in the same manner as contacts 187 but during the No. 2 impulse period of cam sleeve 177. During the No. 3 impulse period, contact pair 189 opens to erase the selection existing (if one had existed) on primary relays 180 by breaking its locking circuit. When cam sleeve 177 reaches its No. 5 position as the sensing levers 172 operate, the first ciphering selection will now be acquired for primary storage relays 180.

When the second plain English character is transmitted, contact pair 160 will be closed by clutch throwout lever 130 as described releasing cam sleeve 177 for its second revolution. During the start impulse, make before break contacts 187 operate as before but now enable the double wound relays 179 to acquire the selection existing in primary storage relays 180 and transfer the first key ciphering selection to transmitter coding magnets 182 which lock up as previously described. Make before break contacts 188 will perform a similar function for receiver code magnets 183 during the No. 2 period of operation of cam sleeve 177. During the No. 3 period, contact pair 189 will open to erase the selection existing in the primary relays 180 which will acquire the second ciphering selection from key tape 171 when cams 175 reach the No. 5 position as tape sensing levers 172 operate.

Now when the keyboard transmitter 166 is operated a third time, ciphering bars 41 (Fig. 1) will have been set to the positions representative of the first key ciphering signal and accordingly the first enciphered signal will be transmitted. Likewise ciphering slides 119 (Fig. 8) will have been set to positions representative of the first key signal and receiver 101 will function to decipher the first enciphered signal repeated by selector magnet 102 to print the character in plain English form. As cam sleeve 177 is released for the third time it should be mentioned that the make before break contact 188 is timed to operate after the printing vanes lock to insure that the same key signal used for enciphering will be used for deciphering. The cycles of operation described will now be repeated as the remaining portion of the ciphering operation proceeds. It is obvious from an inspection of the circuit shown in Fig. 15 that the ciphering system may be operated in either direction of transmission, with the identical key tape at each station occupying the same positions.

Another modification of the invention disclosed in Figs. 16 to 23 inclusive wherein a series of key coding drums 225 which afford a large number of key code combinations are substituted for the key ciphering tape, will now be described. The drums 225 are notched promiscuously to represent marking and spacing conditions to provide key ciphering code combinations. It is assumed of course that a transmitting and a receiving station will be equipped with identical key coding drums 225 which will be set to like positions, there being a total of thirty-two positions for each code drum. The first portion of this modification to be described relates to the ciphering mechanism to be used with a keyboard transmitter indicated generally as 226 which is similar to the keyboard transmitter illustrated in Figs. 1 to 7 inclusive.

Journalled on the frame member 227 and 228 (Fig. 17) is a shaft 229 to which is fixedly attached a ratchet 231 which is stepped one position by a pawl 232 in each cycle of operation as will later be described. Freely rotatable about the shaft 229 is also mounted a cam sleeve 233 to which is fixedly secured a ratchet 234 which is variably stepped either one or two positions or not at all in each cycle of the operation by a pawl 235, as will also later be described.

A series of sensing levers 236 are pivoted on rod 237 and urged in a clockwise direction as viewed in Fig. 16, into engagement with the periphery of associated code drums 225 by means of springs 238 which enables pointed arms 239 of sensing levers 236 to feel the periphery of the code drums 225 according to marking or spacing conditions. Depending arms 241 of the sensing levers 236 are in engagement with associated ciphering levers 242 which are pivoted at 243 and normally urged in a clockwise direction by means of springs 244. Thus, depending on whether a high part or spacing condition of coded drum 225 or a notch or marking condition presents itself to arms 239 of the sensing levers at a given time, individual ciphering levers 242 will either be retained in their leftward or marking position or will be allowed to move to their rightward or spacing position.

Selecting fingers 245 are under the control of the permutation bars 246 which are set to marking or spacing positions when the keyboard is operated as described in the main embodiment of the invention. Selecting fingers 245 carry links 247 which are pivoted at 248 and have secured thereto pins 249 which are designed to ride in arcuate slots 251 of the transmitting levers 252.

The relative positions of pins 249 with respect to the notches 253 of ciphering levers 242 govern the operation of the transmitting lever 252 to allow transmitting contact pairs 254 to remain open or closed according to enciphered signals. The permissive operation of transmitting contact pairs 254 is accomplished in the usual manner by a series of five transmitting cams 255, Fig. 17. A sixth cam 256 is provided for sending start-stop impulses in the conventional manner by controlling contact pair 257. The operation of ciphering levers 242 and selecting fingers 245 may be readily understood by reference to the chart illustrated in Fig. 7 of the drawings and previously described.

The pawl 232 is pivotally connected to locking lever 257 at 258 which is urged in a counterclockwise direction about the pivot 259 by means of spring 261 to place its follower 262 normally in contact with the high part 263 of cam 264 which is mounted on cam sleeve 265. Therefore, from the above description, it is obvious that in each operation of cam sleeve 265, shaft 229 will be stepped one position in a clockwise direction as locking lever 257 moves down and returns to its upward position. Fixed about the shaft 229 for movement therewith is a variable feed disc 266 whose periphery 267 (Fig. 18) is notched at two different levels 268 and 269 for a purpose which will later appear, there being thirty-two positions of the disc 266, equal to the number of teeth in ratchet 231.

Pivotally mounted at 271 (Fig. 18) is a feed control lever 272 which is normally urged in a counterclockwise direction into engagement with the periphery of cam 273 carried by cam sleeve 265 by means of a spring 274, at its follower surface 275. Fixed for pivotal movement with lever 272 is an upstanding sensing arm 278 having a pointed end 279 which feels the periphery 267 of variable feed disc 266. Pivotally attached to the feed control lever 272 at 277 is the stepping pawl 235 which is urged into engagement with the teeth of ratchet 234 by means of a spring 278a.

It now can be seen that according to the position of the pointed end 279 of sensing arm 278 upon the periphery 267 of variable feed disc 266 the control lever 272 may be permitted to pivot in a counterclockwise direction by the action of spring 274 either to one position determined by level 268, or another position determined by level 269 or no movement at all will be permitted when the pointed end 279 engages the outer periphery 267 of the variable feed disc 266. This pivoted movement is permitted upon rotation of cam sleeve 265 when a low part is reached on cam 273 by follower 275 of control lever 272. As the follower 275 rides to the high part of cam 273, ratchet 234 is accordingly stepped one or two positions by the pawl 235 or is allowed to remain in its same position. The code drums 225 carried by cam sleeve 233 will thus be set to their various positions. The pawl 232 operates ratchet 231 forward one position for each operating cycle towards the end of rotation of cam sleeve 265 as follower 262 of locking lever 257 rides upon the high part 263 of cam 264 as has been already described. To insure retention of the code drums 225 in their various positions a detent 281 is provided which is pivoted at 271 and normally urged in a counterclockwise direction by means of spring 282 into engagement with the teeth of ratchet 234.

In order to set each of the code drums 225 at a particular position upon the commencement of a ciphering operation, two indicator dials 283 and 284, having thirty-two positions and a fixed pointer 285 are provided. The dial 283 is fixed for rotation with shaft 229 and dial 284 is rotatable with the cam sleeve 233. Thus by a prearrangement the dials 283 and 284 may be set to any one of their thirty-two positions at the transmitting and receiving station so that identical key code signals are afforded for both enciphering and deciphering operations.

For simple ciphering operations there may be provided in connection with this modification of the invention a manually rotatable shaft 291 (Fig. 22) suitably positioned below pawls 232 and 235. Shaft 291 carries cam member 292 which operates pawl 232 and a second cam member 293 which operates pawl 235. By this arrangement a set screw not shown could be inserted in cam sleeve 233 at a threaded opening 294 to lock the sleeve to shaft 229. Cam 293 may then be turned by knob 295 to a position to disengage pawl 235 from the ratchet 234. Thus cam sleeve 233 would be stepped one position for each operation of the pawl 232. For even simpler ciphering, knob 295 may be turned to a position to disengage both pawls 232 and 235 from their associated ratchets so that the code drums 225 remain in a fixed position.

The modification of the invention which utilizes code drums in place of a key ciphering tape will now be described in connection with the printer receiving unit, with particular reference to Figs. 19 to 21 inclusive.

Numeral 305 represents the selector magnet which receives incoming signals and accordingly positions the swords 306 to either their marking or spacing positions, as is more completely described in an earlier part of the specification, to engage either surface 307 or 308 of the lever 309, to pivot the levers about pivot 311, so that the projecting edges 312 thereof, move either to their right or marking positions, or to their left or spacing positions. Projections 312 are designed to cooperate with the projections 313 of the ciphering slides 314 to determine whether vertical slides 315 will be permitted to move to their upward position, or will remain in their downward position, to operate vanes 316 by means of the bifurcations 317 to marking or spacing positions. Upward movement of slides 315 is accomplished by means of bell cranks 318 which are pivoted at 319 and normally biased in a counterclockwise direction by means of springs 321.

Slides 315 will be enabled to move upwardly when projections 312 and 313 are offset with respect to each other, indicating opposite signal conditions, that is, one being in the marking position and the other in the spacing position. Release of the slides 315 is permitted when the printing vanes 316 are unlocked and bail 310 carried by T-lever 322 is moved upward. T-lever 322 is pivoted at 323 and normally urged in a clockwise direction by means of spring 324. Carried by the T-lever 322 is a pin 325 designed to ride in the bifurcation 326 of the operating lever 327 which is pivoted at 328 and includes a follower 329 for engaging the periphery of printing bail cam 331.

The positioning of the ciphering slides 314 is controlled by means of key code drums 332 which are notched promiscuously to indicate marking or spacing conditions. Code drums 332 are mounted upon and rotatable with cam sleeve 333 about shaft 334 journalled on the frame members 335 and 336. Attached to slides 314 near the rearward extremity thereof are pins 337 designed to ride in the slots 338 of sensing levers 339 which are pivoted about the rod 341 and urged in a clockwise direction by springs 330. Sensing levers 339 are connected to the ciphering slides 314 by means of springs 342 so that as projections 343 of the sensing levers 339 feel the periphery of the code drums 332, ciphering slides 314 tend to follow the movement of sensing levers 339.

For accomplishing the stepping of the code drums 332, a stepping arrangement such as described in connection with the transmitting portion of the invention is employed. Fixed to shaft 334 (Fig. 21) journalled on frame members 335 and 336 is a ratchet 344 which is driven by pawl 345 pivotally connected at 346 to lever 347 which is pivotally mounted on rod 348. A spring 349 (Fig. 23) urges the pawl 345 into engagement with the teeth of ratchet 344. Lever 347 is pivotally connected at 351 to one end of lever 352, which at its other end is pivotally connected at 353 to the depending arm 354 of T-lever 322. Thus, upon each rotation of cam 331 operating lever 327 will pivot T-lever 322 in a counterclockwise direction removing bail 310 from engagement with the base of slides 315 and causing lever 352 to be reciprocated thereby operating lever 347 and pawl 345, to step ratchet 344 and shaft 334 forward one position.

Fixed for rotation with shaft 334 is a variable feed control disc 355 similar to the disc 266 previously described in connection with the transmitter, having an outer periphery 356, a first level notched at 357 and a second level notched at 358, which is sensed by a sensing arm 359 integrally formed as part of lever 361 which pivots about rod 348 and is normally urged in a clockwise direction by means of a spring 362. Pivotally connected at 350 to lever 361 is a stepping pawl 364 which is urged into engagement with ratchet 365 by means of spring 360, which is secured to sleeve 333. Pivotally connected to lever 361 at 340 is a slidable lever 363 which at its other end has a slot 368 for slidable engagement with a suitably mounted fixed pin 369. Slidable lever 363 is normally retained in its leftward position by means of the printer function bail 371 which is operable by a function bail cam, not shown, and in each cycle of operation moves to the right and returns to its leftward position. Thus, according to the operation of sensing arm 359 slidable lever 363 may be allowed to move to the right due to the action of spring 362 to follow function bail 371 and will be pushed to its leftward position as the function bail 371 returns to its normal position. This reciprocable movement of slidable lever 363 if allowed by sensing arm 359 of lever 361 enables pawl 364 to step ratchet 365 either one or two positions. If lever 361 is not permitted to move at all by sensing arm 359 engaging the outer periphery 356 of disc 355, ratchet 365 will remain in its same position. It is understood that suitable detents, not shown, will be provided for ratchets 344 and 365 to retain them in their different positions.

A typical deciphering operation will now be described in order to facilitate a ready understanding of this portion of the invention. As the first enciphered signal is received by the selector magnet 305, swords 306 are positioned according to the signals for operation of levers 309. Ciphering slides 314 will be in the last position according to the code presenting itself to projections 343 of sensing levers 339. As printing bail cam 331 is released for operation near the end of the receipt of the first signal, as explained in an earlier part of the description, follower 329 of lever 327 is engaged causing T-lever 322 to be pivoted in a counterclockwise direction removing bail 310 from engagement with the base of vertical slides 315, allowing selected slides 315 to move upwardly to operate vanes 316. Shortly thereafter, the printing vanes lock and a plain English deciphered signal is printed.

As the T-lever 322 is pivoted as explained above, lever 352 is moved to the right and later returns to the left stepping ratchet 344 forward one position as will be described hereinafter. Before lever 352 returns to the left, however, arm 359 of lever 361 feels for a new level, as function bail 371 moves to the right, upon the variable feed disc 355. If permitted to do so by the variable feed disc 355, lever 361 will pivot in a clockwise direction one or two steps and upon the return movement of function bail 371, will step ratchet 355 and code drums 372 one or two positions. Of course, if no pivotal movement of lever 361 is permitted, no feeding of ratchet 355 will take place.

As cam 331 rotates, the printer vanes 316 are unlocked but prior to this time, bail 310 is ready to move to a position holding vertical slides 315 in their downward position since a low part of cam 331 will now be presented to follower 329 of lever 327 and spring 324 will pivot T-lever 322 in a clockwise direction. Clockwise pivotal movement of T-lever 322 moves lever 352 to the left to thereby enable pawl 345 to step ratchet 344 to its next position. At this time ciphering slides 314 may move to their next ciphering position if they have been previously blocked by interference of their projections 313 with projections 312 of levers 309. Likewise, levers 309 may assume the new setting determined by receipt of the next signal by selector magnet 305 and the position of swords 306. This belated movement of slides 314 may be permitted due to the spring connection existing between slides 314 and sensing lever 339, provided by springs 342.

For setting the code drums 332 to their starting positions by a prearrangement with another station, indicator dials 471, 372 and a pointer 373 are provided. Dial 471 is rotatable with sleeve 333 while dial 372 is rotatable with the shaft 334.

A modified form of stepping arrangement for a set of coding drums 375 for use in connection with a keyboard transmitter is disclosed in Figs. 24 to 26 which afford a great number of key cipher signals. Actually the five coding drums 375 which are independently rotatable to thirty-two different positions afford 33,554,432 possible combinations before repetition, which is mathematically, thirty-two to the fifth power.

Each code drum 375 is fixed to a ratchet 376, which together are mounted on individual sleeves 377 for rotation about the shaft 378 journalled in frame members 379 and 381. For retaining the ratchets 376 in position, detents 382 are provided which are urged into engagement with the teeth of ratchets 376 by means of springs 383. Four of the individual ratchets 376 are stepped by pawls 384 of progressively shorter lengths which are mounted for pivotal movement and move as a unit about a common shaft 385 carried by locking lever 380. The pawls 384 are urged into engagement with the teeth of ratchets 376 by means of a pair of springs 386. The upper four ratchets 376, as viewed in Fig. 25, are each provided with a single progressively deeper notch 387, the one associated with the longest pawl 384 being the ratchet viewed at the top of Fig. 25 which has the deepest notch 387. Otherwise, the contour of the ratchets 375 at its other thirty-one positions is similar to the lowermost ratchet 375 shown in Fig. 25 which is designed to be engaged by the shortest pawl 384 and whose teeth are the same at all thirty-two positions.

Assuming that the notches 387 of the four uppermost ratchets 376 are in alignment, the next stepping operation of the pawls, provided by the operation of locking lever 380, will advance all the ratchets 376 and their associated code drums 375 one position. On the next stepping operation only the ratchet 376 engaged by the longest pawl 384 will be advanced since the other four pawls 384 will be held out of engagement with the teeth of their respective ratchets 376. The stepping operation of the longest pawl 384 will continue until the deep notch 387 provided in its associated ratchet 376 is again encountered by its associated pawl 384. At this time the longest pawl 384 will fall partially into the notch 387 and allow the next longest pawl 384 to engage a normal tooth of its associated ratchet to advance it one step. On the immediately following stepping operation only the longest pawl 384 will again step its ratchet 376. The operation will continue in this manner until a point will be reached where all the deep notches 387 are again in alignment.

Depending arms 388 of sensing levers 389 which are pivoted at 371 control the positioning of ciphering levers 392 as is more completely described in connection with sensing levers 236 disclosed in Fig. 16. Springs 393 urge sensing levers 389 in a clockwise direction into engagement with the key coding drums 375, to thereby sense the periphery of the code drums 375 for marking or spacing conditions.

The application of this modification of the invention for use in the printer receiver will now be described with particular reference to Fig. 27. Cam sleeve 391 represents the sleeve of the printer receiver on which is mounted the usual printing bail cam and function bail cam previously described. Fixed to cam sleeve 391 is an added cam 392 which by means of its high part 493 operates a follower 394 pivoted at 395 and urged in a clockwise direction by a spring 396. Pivotally mounted to follower 394 at 397 is a lever 398 which at its other end is pivotally mounted at 399 to one of a pair of spaced levers 401, only one of which is shown, and which are pivoted about the rod 402. Supported by levers 401 is a pivot rod 403 designed to carry a series of stepping pawls 404 of progressively different lengths similar to the pawls 384 shown in Fig. 26. Pawls 404 are biased in a counterclockwise direction by means of a spring 405 for engagement with the teeth of ratchets 406 which are similar to ratchets 36 shown in Fig. 25. Code discs 407 are similar to the code discs 375 likewise disclosed in Fig. 25. Sensing levers 408 and ciphering slides 409 are the equivalent of sensing levers 339 and ciphering slides 314 disclosed in detail in Figs. 19 and 20.

In operation, after the vanes of the printer have been locked upon rotation of cam sleeve 391, high part 493 of cam 392 is effective to operate follower 394 to thereby cause actuation of the stepping pawls 404 as levers 401 pivot about the rod 402. Details of operation of the stepping pawls 404 and ratchets 406 have already been described in connection with similar members shown in Figs. 24 to 26 and a repetition of that description is deemed unnecessary.

Various changes and modifications may be made in the above described invention without a departure from the spirit and scope of the invention as defined in the following claims.

What is claimed is:

1. A ciphering device including a set of key coding instrumentalities having promiscuous representations of opposite telegraph signalling conditions, means for advancing one of said instrumentalities and retaining other of said set stationary under certain operating conditions, means for advancing one or more of said instrumentalities under other operating conditions, a set of ciphering levers positionable in a key code combination according to the representative code combination presented at a particular time by said instrumentalities, a set of selecting members, and a set of transmitting members controlled jointly by said ciphering levers and said selecting members.

2. A ciphering device including a set of key coding drums having promiscuous representations of opposite telegraph signalling conditions, means for advancing one of said code drums independently of the others, means for enabling the unitary advancement of one or more of said code drums, a set of ciphering levers positionable in a key code combination according to the representative code combination presented at a particular time by said coding drums, a set of signal controlled selecting members, and a set of transmitting members controlled jointly by said ciphering levers and said signal controlled selecting members for transmitting enciphered signals.

3. In a ciphering transmitter, a plurality of slidable permutation bars operable according to code combinations, an equal number of selecting fingers controlled by said permutation bars, a like number of key code combination responsive ciphering levers, a ciphering device for controlling said ciphering levers and including a set of key coding drums having promiscuous representations of opposite telegraph signalling conditions, means for advancing one of said code drums independently of the others, means for enabling the unitary advancement of one or more of said code drums, said ciphering levers being positionable in a key code combination according to the representative code combination afforded at a particular time by said coding drums and a set of transmitting levers operable under the joint control exercised thereover by said selecting fingers and said ciphering levers for transmitting enciphered telegraph signals representing a combination of said code combinations operating said slidable permutation bars and said key code combinations positioning said ciphering levers.

4. In a ciphering selector, a plurality of code combination controlled members, a like number of key code combination controlled members, an equal number of selectable elements jointly controlled by said first and second mentioned members, a plurality of key code drums positionable to a variety of positions for controlling said second mentioned members, a plurality of advancing means for advancing said plurality of key code drums to said variety of positions, each individual one of said plurality of advancing means being associated with and being designed to advance a corresponding one of said plurality of key code drums, means for operating said plurality of advancing means, means for insuring the advancement of one of said key code drums by its corresponding advancing means under certain operating conditions, and means for enabling the advancement of more than one of said key code drums by their corresponding advancing means under other operating conditions.

5. In a ciphering selector, a plurality of code combination controlled members, a like number of key code combination controlled members, an equal number of selectable elements jointly controlled by said first and second mentioned members, a plurality of key code drums positionable to a variety of positions for controlling said second mentioned members, a plurality of pawls for advancing said code drums to said variety of positions, each of said pawls being designed to advance a corresponding one of said code drums, means for actuating said pawls, means for insuring the advancement of one of said code drums by the corresponding pawl upon actuation thereof during certain operating conditions, and means for enabling the advancement of more than one of said code drums by their corresponding pawls during actuation thereof under other operating conditions.

6. In a ciphering selector, a plurality of code combination controlled members, a like number of key code combination controlled members, an equal number of selectable elements jointly controlled by said first and second mentioned members, a plurality of key code drums positionable to a variety of positions for controlling said second mentioned members, a plurality of pawls for advancing said code drums to said variety of positions, each of said pawls being designed to advance a corresponding one of said code drums, means for actuating said pawls, a ratchet associated with each code drum for enabling the advancement of each of said code drums by the corresponding pawl, said pawls being effective upon actuation thereof to advance one of said code drums during certain operating conditions, and notches in certain of said ratchets for enabling advancement of more than one of said code drums by said pawls upon actuation thereof during certain other operating conditions.

7. In a ciphering transmitter, a plurality of code controlled selectable members, a plurality of key code controlled selectable members, a plurality of transmitting members jointly controlled by said code controlled members and said key code controlled members, a plurality of key code wheels movable to a variety of positions for controlling said key code controlled selectable members, each of said key code wheels being movable individually, a ratchet associated with and rotatable with each of said key code wheels, a plurality of pawls cooperable with the ratchets for moving said key code wheels to said variety of positions, said pawls being effective to move at least one of said key code wheels during each operation of said pawls, notches in certain of the ratchets cooperable with associated ones of said pawls under certain operating conditions for enabling the simultaneous movement of more than one of said key code wheels under said certain operating conditions, and means for actuating said transmitting members and said pawls in timed relation with the joint control of said transmitting members by said code controlled selectable members and said key code controlled selectable members.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
| --- | --- | --- |
| 2,317,995 | Krum | May 4, 1943 |
| 2,394,765 | Hagelin | Feb. 12, 1946 |
| 2,402,082 | Reiber | June 11, 1946 |